(12) United States Patent
Xiao et al.

(10) Patent No.: US 7,832,892 B2
(45) Date of Patent: Nov. 16, 2010

(54) SOLAR LED LAMP ASSEMBLY

(75) Inventors: Xin-Jian Xiao, Shenzhen (CN);
Shih-Hsun Wung, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 94 days.

(21) Appl. No.: 12/255,658

(22) Filed: Oct. 21, 2008

(65) Prior Publication Data

US 2009/0316395 A1  Dec. 24, 2009

(30) Foreign Application Priority Data

Jun. 18, 2008  (CN) .................. 2008 1 0067914

(51) Int. Cl.
*F21L 13/00*  (2006.01)
*F21L 4/02*  (2006.01)
*F21L 4/08*  (2006.01)

(52) U.S. Cl. .................. 362/192; 362/145; 362/414; 362/249.02; 362/294; 362/373

(58) Field of Classification Search ................. 362/192, 362/145, 249.02, 294, 218, 373, 414
See application file for complete search history.

(56) References Cited

U.S. PATENT DOCUMENTS

| | | | | |
|---|---|---|---|---|
| 2,456,179 A * | 12/1948 | Finer | ..................... | 362/431 |
| 3,270,480 A * | 9/1966 | Beecker | ..................... | 52/848 |
| 3,784,808 A * | 1/1974 | Mori | ..................... | 362/294 |
| 3,862,411 A * | 1/1975 | Persson | ..................... | 362/431 |
| 4,200,904 A * | 4/1980 | Doan | ..................... | 362/183 |
| 4,281,369 A * | 7/1981 | Batte | ..................... | 362/183 |
| 5,149,188 A * | 9/1992 | Robbins | ..................... | 362/183 |
| 5,426,574 A * | 6/1995 | Carolfi | ..................... | 362/235 |
| 7,018,063 B2 * | 3/2006 | Michael et al. | ..................... | 362/183 |
| 7,420,811 B2 * | 9/2008 | Chan | ..................... | 361/709 |
| 7,455,430 B2 * | 11/2008 | Huang | ..................... | 362/294 |
| 7,488,093 B1 * | 2/2009 | Huang et al. | ..................... | 362/294 |
| 7,588,355 B1 * | 9/2009 | Liu et al. | ..................... | 362/373 |
| 2001/0030866 A1 * | 10/2001 | Hochstein | ..................... | 362/294 |
| 2004/0196653 A1 * | 10/2004 | Clark et al. | ..................... | 362/183 |
| 2006/0012978 A1 * | 1/2006 | Allsop et al. | ..................... | 362/183 |
| 2006/0250803 A1 * | 11/2006 | Chen | ..................... | 362/373 |
| 2007/0081338 A1 * | 4/2007 | Kuan | ..................... | 362/294 |

(Continued)

FOREIGN PATENT DOCUMENTS

JP  2003051208 A  *  2/2003

*Primary Examiner*—Ismael Negron
(74) *Attorney, Agent, or Firm*—Frank R. Niranjan

(57) ABSTRACT

A solar LED lamp assembly includes a mounting member and two LED lamps fixed to a free end of the mounting member. The mounting member includes a pole and a cylindrical canister coupled with a distal end of the pole. The two LED lamps are respectively fixed to two opposite lateral sides of a circumferential periphery the canister of the mounting member and extend across each other. Each LED lamp includes a lamp frame, a plurality of LED modules mounted in the lamp frame and a solar panel mounted over a top of the lamp frame. The solar panel receives solar energy and converts it into electrical energy to activate the LED modules to radiate light.

14 Claims, 4 Drawing Sheets

U.S. PATENT DOCUMENTS

| | | | |
|---|---|---|---|
| 2007/0086196 A1* | 4/2007 | Wong | 362/294 |
| 2008/0043479 A1* | 2/2008 | Wang | 362/373 |
| 2008/0285265 A1* | 11/2008 | Boissevain | 362/218 |
| 2009/0213588 A1* | 8/2009 | Manes | 362/235 |
| 2009/0268441 A1* | 10/2009 | Chen | 362/192 |

* cited by examiner

SOLAR LED LAMP ASSEMBLY

BACKGROUND OF THE INVENTION

1. Field of the Invention

The present invention relates to a solar LED lamp assembly, and more particularly to a solar LED lamp assembly which utilizes solar energy to drive an LED lamp.

2. Description of Related Art

An LED lamp is a type of solid-state lighting that utilizes light-emitting diodes (LEDs) as a source of illumination. An LED is a device for transferring electricity to light by using a theory that, if a current is made to flow in a forward direction through a junction region comprising two different semiconductors, electrons and holes are coupled at the junction region to generate a light beam. The LED has an advantage that it is resistant to shock, and has an almost eternal lifetime under a specific condition; thus, the LED lamp is intended to be a cost-effective yet high quality replacement for incandescent and fluorescent lamps.

Known implementations of LED lamp are electrically powered. However, it is not feasible to use the electrically powered LED lamp assembly in some wild areas such as desert, mountain chains and virgin forest for there being no electrical power supply in such remote areas.

What is needed, therefore, is a solar LED lamp assembly which can overcome the above-mentioned disadvantages.

SUMMARY OF THE INVENTION

A solar LED lamp assembly for lighting purpose includes a mounting member and two LED lamps fixed to a free end of the mounting member and extending from two opposite lateral sides of the free end of the mounting member. The mounting member includes a pole and a canister coupled with a distal end of the pole. The two LED lamps are respectively fixed to two opposite lateral sides of the canister of the mounting member. Each LED lamp includes a lamp frame extending from one lateral side through the opposite lateral side of the canister to a position distant from the canister, a plurality of LED modules mounted in the lamp frame and a solar panel mounted over a top of the lamp frame. The solar panel receives solar energy and converts it into electrical energy which is used to activate the LED modules.

Other advantages and novel features of the present invention will become more apparent from the following detailed description when taken in conjunction with the accompanying drawings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
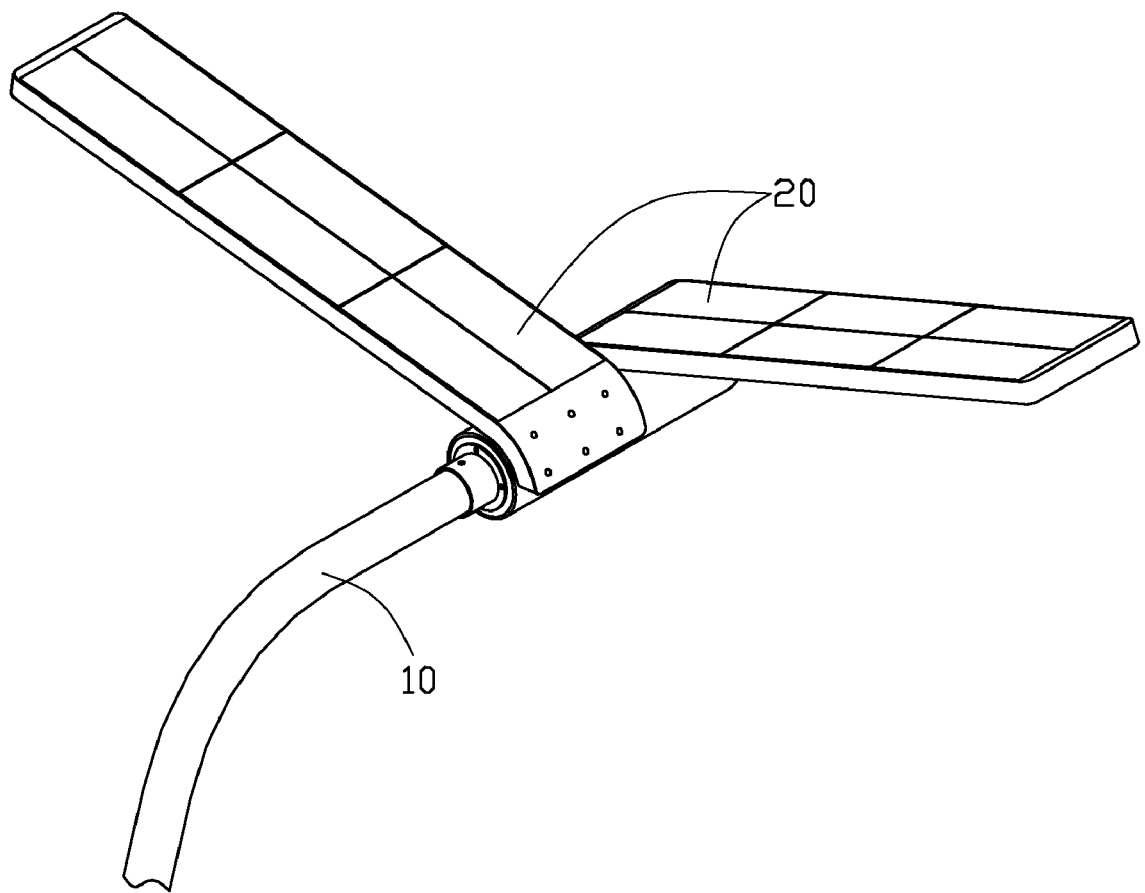
FIG. 1 is an assembled, isometric view of a solar LED lamp assembly in accordance with a preferred embodiment of the present invention.
Figure 2:
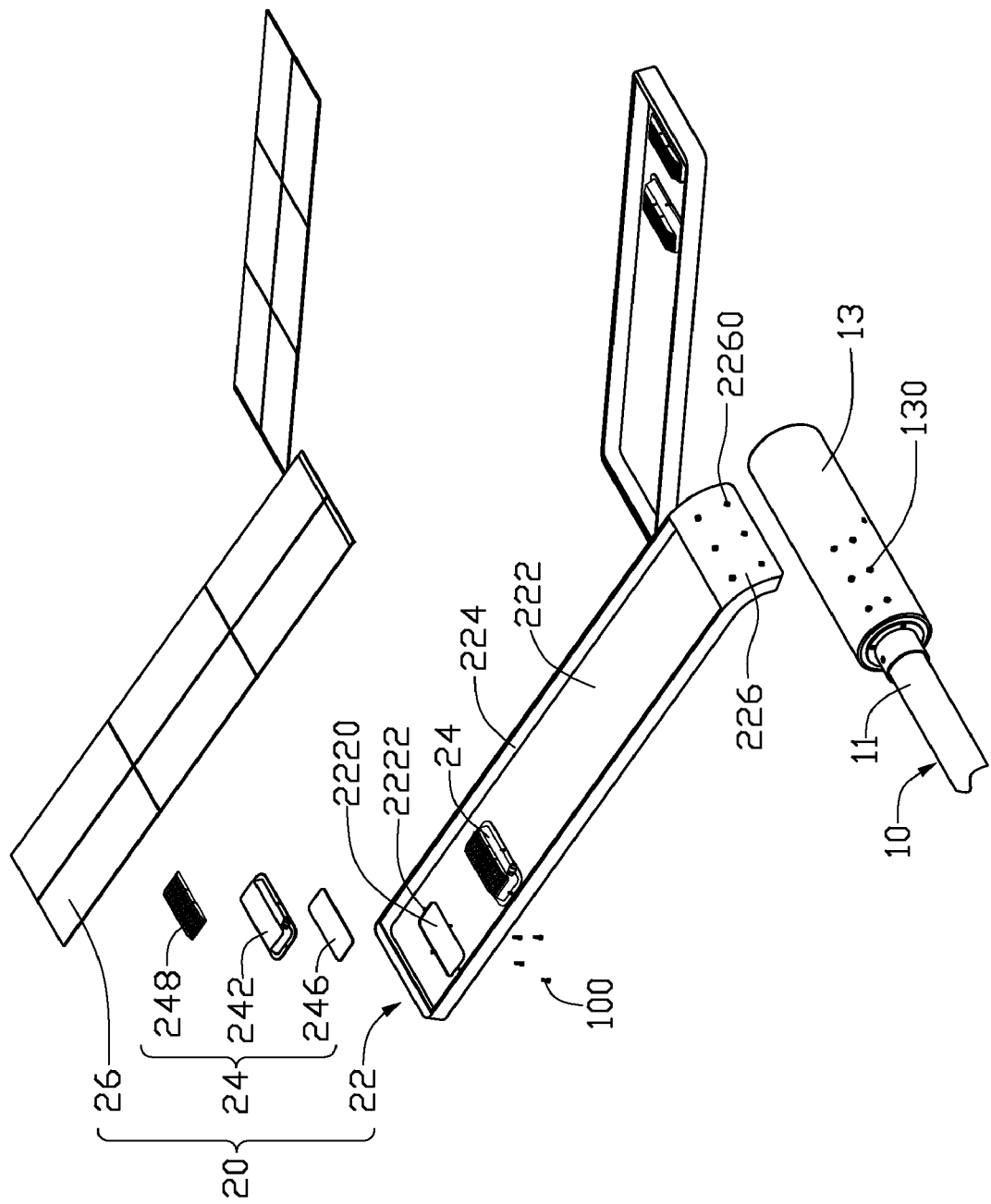
FIG. 2 is an exploded view of FIG. 1.

Referring to FIGS. 1-2, a solar LED lamp assembly is located in an outdoor location for a lighting purpose and comprises a fixing member 10 and two LED lamps 20 fixed to and extending slantwise upwardly toward two opposite directions from a free end of the fixing member 10.

The fixing member 10 is configured to hold the solar LED lamp assembly in a working position and comprises a pole 11 and a canister 13 coupled to a free end of the pole 11. The canister 13 defines a plurality of mounting orifices 130 in two opposite sides of a circumference thereof, for securing the fixing the LED lamps 20 to the canister 13. The canister 13 can receive a rechargeable battery and other relative electronic components therein, for providing the LED lamps 20 with electrical power which is obtained by converting solar energy into electrical energy.

Figure 3:
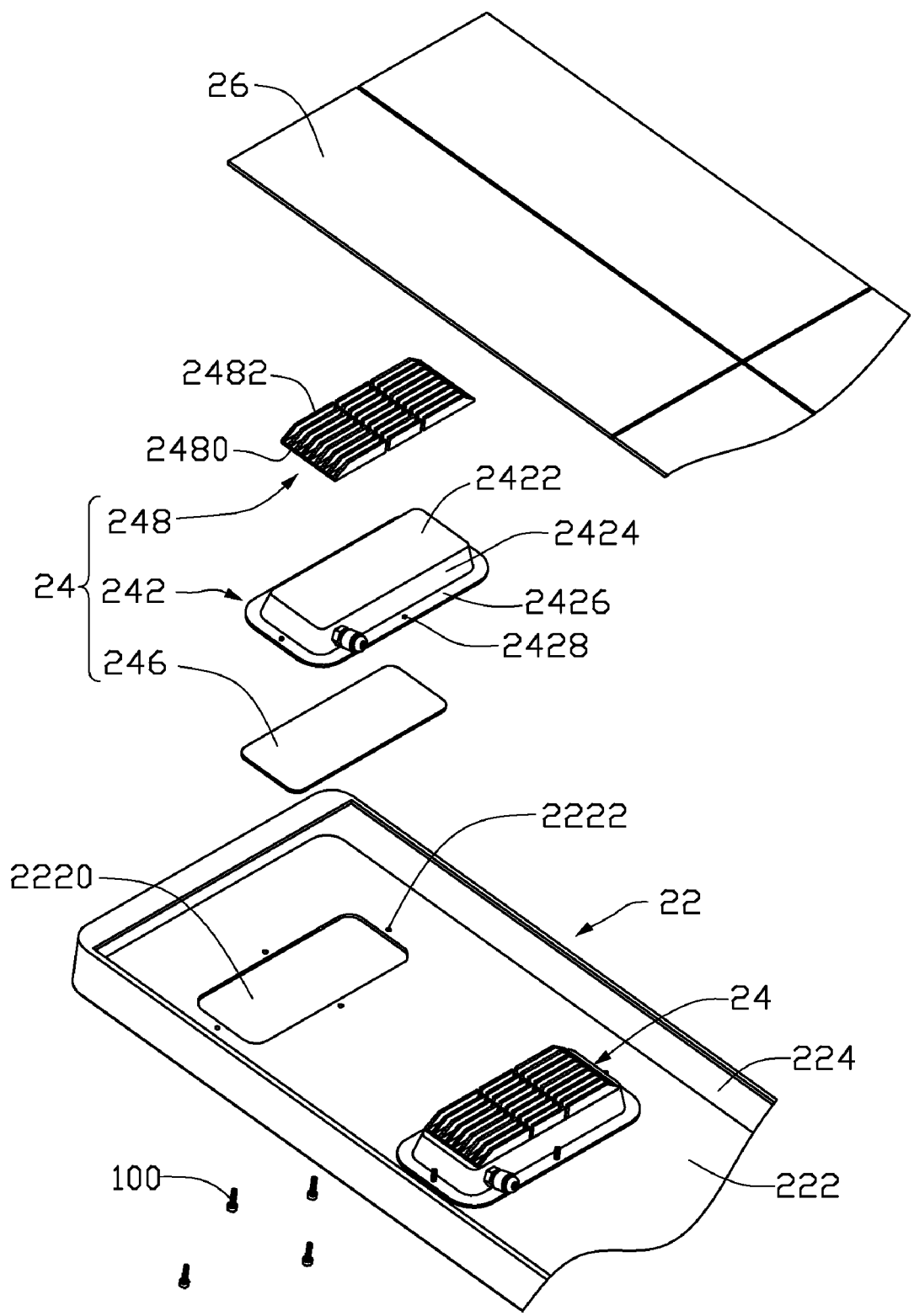
FIG. 3 is an enlarged, exploded view of a distal portion of an LED lamp of the solar LED lamp assembly of FIG. 1.
Figure 4:
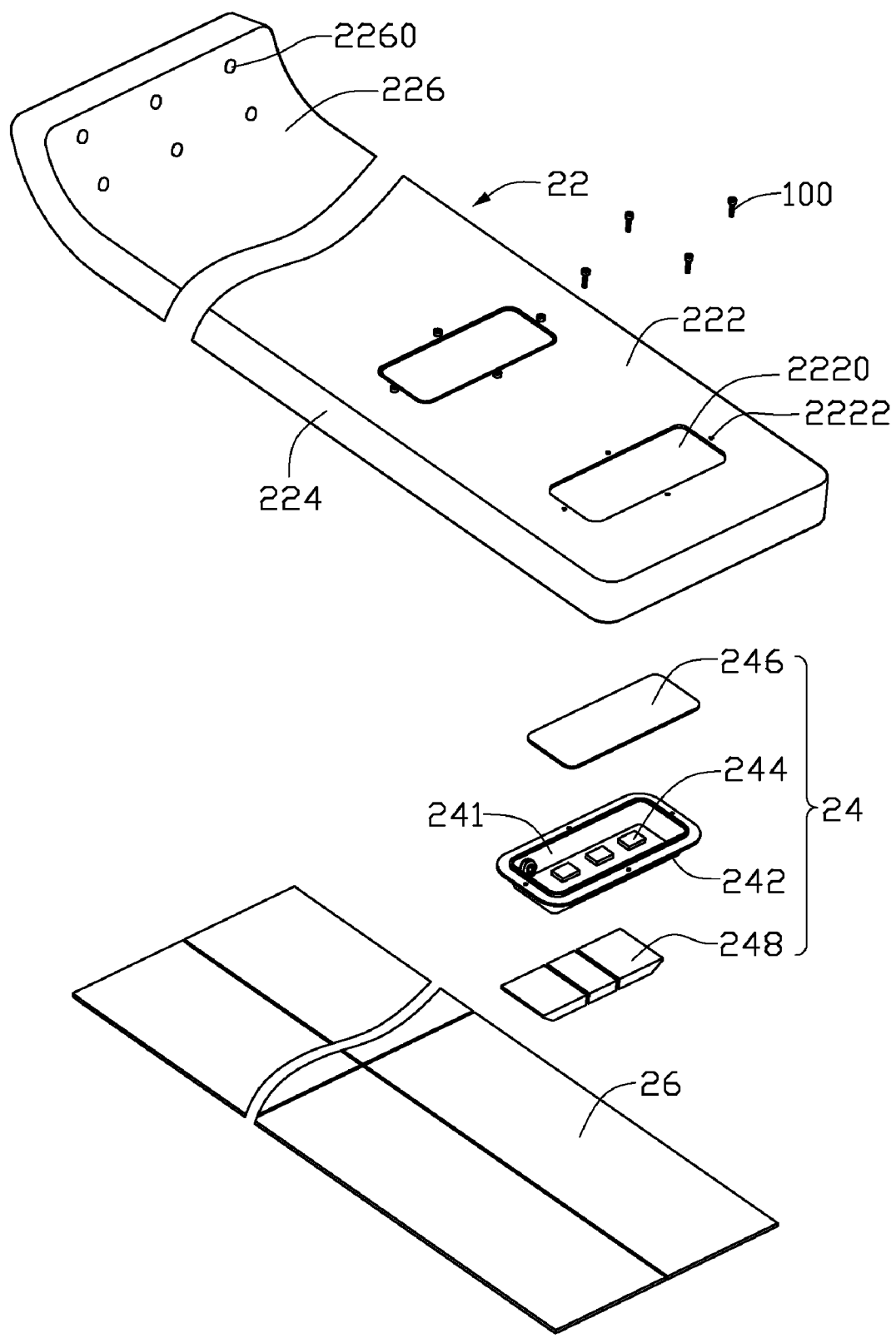
FIG. 4 is an inverted, exploded view of the LED lamp of FIG. 3.

Referring to FIGS. 3-4 also, each of the LED lamps 20 comprises a lamp frame 22, two LED modules 24 received in the lamp frame 22 and a solar panel 26 covering on the lamp frame 22. The lamp frame 22 comprises a rectangular base plate 222 parallel to the solar panel 26, a side plate 224 extending upwardly from an edge of the base plate 222 and a mounting part 226 extending outwardly and downwardly from a short side of the base plate 222 near the canister 13. The base plate 222 defines two rectangular through holes 2220 therein, located near a distal short side of the base plate 222, for traveling of light generated by the LED modules 24 therethrough. The two through holes 2220 are spaced from and parallel to each other, and located remote from the mounting part 226. The base plate 222 defines a plurality of fixing orifices 2222 therein closely surrounding the through hole 2220 for upward extensions of screws 100 therethrough. Each of the mounting parts 226 is curved into an arched shape, arranged side by side on the canister 13 and spans transversely over the canister 13 of the fixing member 10 from one lateral part to another opposite lateral part of the circumference of the canister 13. The mounting part 226 defines a plurality of through orifices 2260 therein. The through orifices 2260 are respectively in alignment with the mounting orifices 130 of the canister 130 for extension of fixtures (not labeled) therethrough to engage into the mounting orifices 130 to couple the mounting part 226 onto the canister 13.

The LED modules 24 are mounted on the base plate 222 of the lamp frame 22 and respectively in alignment with the through holes 2220 of the base plate 222. Each of the LED modules 24 comprises a cuboid-shaped mounting box 242, a plurality of LED components 244 mounted in the mounting box 242, a rectangular plate-shaped lens 246 covering an opening 241 of the mounting box 242 and a heat sink 248 attached to a top of the mounting box 242.

The mounting box 242 defines the opening 214 in a bottom thereof and comprises a rectangular top panel 2422, a light-guiding sidewall 2424 extending downwardly from an edge of the top panel 2422 and an engaging flange 2426 extending horizontally and outwardly from a bottom edge of the sidewall 2424. The opening 214 of the mounting box 242 covers an area similar to that of the through hole 2220 of the lamp frame 22. The LED components 244 are fixed to a bottom surface of the top panel 2422 of the mounting box 242 and face the opening 214 of the mounting box 242. The engaging flange 2426 of the mounting box 242 is placed on the base plate 222 of the lamp frame 22, surrounds the corresponding through hole 2220 of the base plate 222 and defines a plurality of engaging orifices 2428 therein. The engaging orifices 2428 are respectively in alignment with the fixing orifices 2222 of the base plate 222 for engagingly receiving the screws 100 extending through the fixing orifices 2222 to thus securely couple the mounting box 242 to the base plate 222 of the lamp frame 22. The lens 246 covering the opening 214 of the mounting box 242 is received in the through hole 2220 of the lamp frame 22 for the light from the LED components 244 traveling therethrough to reach an environment outside the solar LED lamp assembly.

The heat sink 248 is fixed on a top surface of the top panel 2422 of the mounting box 242 by soldering or adhering and adapted for removing heat generated by the LED modules 24 fixed to the top panel 2422 of the mounting box 242. The heat sink 248 comprises a conducting place 2480 attached to the top panel 2422 and a plurality of fins 2482 arranged on the conducting plate 2480. The fins 2482 are perpendicular to the conducting plate 2480 and parallel to two lateral opposite sides of the conducting plate 2480.

The solar panels 26 are respectively coupled to top ends of the lamp frames 22 and enclose the LED lamp modules 24 in the lamp frames 22. The solar panels 26 located on the top ends of the LED lamps 20 are directly exposed to sunshine and used to convert the solar energy into the electrical energy. The electrical energy is then stored in the rechargeable battery which is electrically connected to the solar panels 26 and also connected to the LED modules 24 through a switch (not shown). The solar LED lamp assembly can be equipped with a light sensor which can detect a brightness of an environment of the solar LED lamp assembly. When the environment is dark enough, the sensor sends a signal to the switch to turn the switch on. The switch then electrically connects the rechargeable battery and the LED lamps 20, thereby enabling the electric power stored in the storage battery to be provided to the LED lamps 20.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A solar LED lamp assembly for lighting purpose comprising:
    a mounting member having a pole and a canister coupled with a distal end of the pole; and
    two LED lamps respectively fixed to two opposite lateral sides of the canister of the mounting member and each comprising a lamp frame fixed to and extending from one of the two opposite lateral sides of the canister through the other one thereof to a position remote from the canister, a plurality of LED modules mounted in the lamp frame and a solar panel mounted over a top of the lamp frame, the solar panel being adapted for receiving solar energy and converting the solar energy into electrical energy which is used to activate the LED modules;
    wherein the lamp frame comprises a base plate and a side plate extending upwardly from an edge of the base plate, and the solar panel engages with a top end of the side plate.

2. The solar LED lamp assembly of claim 1, wherein the two LED lamps are oriented slantwise upwardly.

3. The solar LED lamp assembly of claim 1, wherein the lamp frame comprises a mounting part at an end thereof, and the mounting part is curved into an arched shape and fixed to the one of the two opposite lateral sides of the canister.

4. The solar LED lamp assembly of claim 3, wherein the canister has a cylinder-shaped configuration and the two mounting parts of the LED lamps are fixed to two opposite lateral sides of a circumference of the canister.

5. The solar LED lamp assembly of claim 1, wherein the base plate defines a plurality of spaced through holes therein and respectively in alignment with the LED modules which are mounted on the base plate.

6. The solar LED lamp assembly of claim 5, wherein each of the LED modules comprises a mounting box, a plurality of LED components mounted in the mounting box, a rectangular plate-shaped lens covering a bottom of the mounting box and a heat sink attached to a top of the mounting box.

7. The solar LED lamp assembly of claim 6, wherein the lens covering the opening of the mounting box is received in the corresponding through hole of the lamp frame.

8. The solar LED lamp assembly of claim 6, wherein the heat sink is fixed on a top surface of the top panel of the mounting box and comprises a conducting place attached to the top panel and a plurality of fins arranged on the conducting plate.

9. The solar LED lamp assembly of claim 6, wherein the mounting box defines an opening in the bottom thereof, facing a corresponding through hole of the lamp frame and comprises a rectangular top panel, a light-guiding sidewall extending downwardly from an edge of the top panel and surrounding the corresponding through hole.

10. The solar LED lamp assembly of claim 9, wherein the mounting box has an engaging flange extending horizontally and outwardly from a bottom edge of the sidewall, the engaging flange is placed on the base plate of the lamp frame, and surrounds the corresponding through hole of the base plate.

11. The solar LED lamp assembly of claim 10, wherein the LED components are fixed to a bottom surface of the top panel of the mounting box and face the opening of the mounting box.

12. A solar LED lamp assembly comprising:
    a post-shaped mounting member;
    a pair of LED lamps comprising:
        two frames secured to opposites sides of a circumference of a free end of the mounting member, and extending from the opposite sides across each other to positions remote from the free end of the mounting member;
        at least an LED module received in a corresponding frame for radiating light downward to an environment outside the LED lamp assembly; and
        at least a solar panel attached to a top of the corresponding frame, adapted for receiving solar energy and converting the solar energy into electrical energy to activate the at least an LED module;
    wherein the corresponding frame comprises a base plate and a side plate extending upwardly from an edge of the base plate, and the at least a solar panel engages with a top end of the side plate.

13. The solar LED lamp assembly of claim 12, wherein the frames are slantwise, upwardly extended from the free end of the mounting member.

14. The solar LED lamp assembly of claim 13 further comprising a heat sink having a plurality of fins and received in the corresponding frame, the heat sink being in thermal connection with the at least an LED module.

* * * * *